United States Patent Office 3,704,138
Patented Nov. 28, 1972

3,704,138
LOW-CALORIE SWEETENING COMPOSITION AND METHOD OF PRODUCING THE SAME
Anthony Laurence La Via, East Brunswick, and Richard Lawrence O'Laughlin, Jamesburg, N.J., and Richard Wiegmann Walton, Langhorne, Pa., assignors to E. R. Squibb & Sons, Inc., New York, N.Y.
No Drawing. Continuation-in-part of abandoned application Ser. No. 650,659, July 3, 1967. This application Sept. 17, 1970, Ser. No. 73,252
Int. Cl. A23l 1/26
U.S. Cl. 99—141 A          5 Claims

ABSTRACT OF THE DISCLOSURE

This invention relates to novel low calorie sweetening compositions and methods of producing them. More particularly, this invention relates to low calorie, low bulk density sweetening compositions having sweetening power on a volume basis approximately equal to that of sucrose, and which is in the form of a granular free-flowing solid, similar in appearance to ordinary cane sugar. The novel compositions of this invention comprise a combination of hydrolyzed corn starch, arabinogalactan and artificial sweeteners.

RELATED APPLICATION

This application is a continuation-in-part of our copending application Ser. No. 650,659, filed July 3, 1967, and now abandoned.

This invention relates to novel low calorie, low bulk density sweetening compositions and methods of producing them. More particularly, this invention relates to low calorie, low bulk density sweetening compositions having sweetening power on a volume basis approximately equal to that of sucrose, and which is in the form of a granular free-flowing solid, similar in appearance to ordinary cane sugar.

It is known in the art to combine non-calorie sweeteners such as saccharin or a salt thereof with various bulk extenders to prepare sweetening compositions which are more convenient to use than the tablet or liquid preparations of these sweeteners. The bulk extenders heretofore employed, however, possess a variety of disadvantages which substantially reduced this utility. Thus, various gums, including arabinogalactan, gum arabic and gum tragacanth have been proposed as extenders, but the use of such materials is undesirable since they are not readily soluble, especially in cold liquids.

To avoid this disadvantage, it has been proposed to use nutritive carbohydrate extenders which are more soluble, thus avoiding the solubility problem. However, materials containing large amounts of mono-, di-, and trisaccharides as have been suggested, tend to be hygroscopic in nature, with the result that they cake under conditions of use. On the other hand, starch hydrolysates such as dextrins and other extremely low Dextrose Equivalent (percent reducing sugar calculated as dextrose) products, which are essentially free from mono-, di-, and trisaccharides, possess poor solubility, taste and mouth-feel characteristics which preclude their use in a product intended to be as indistinguishable as possible, in use, from ordinary household granulated sugar.

It has now been found that a mixture of a hydrolyzed corn starch, arabinogalactan and artificial sweeteners provides an improved sucrose replacement which avoids the shortcomings of prior bulk extending agents.

The compositions of this invention are formed by preparing an aqueous solution of artificial sweetener, arabinogalactan and a vehicle derived from hydrolyzed cornstarch. Advantageously, the solution is prepared so as to contain a solids content of about 40 to 90 weight percent. This solution may then be dried to yield a white, free-flowing particulate powder or granules of very low bulk density.

The product obtained according to the process of this invention preferably has a bulk density of about .06 to .2 gm./cc., and, on a volume basis has a caloric value of approximately 5 to 25% of household granulated sugar. Most preferably the product of the present invention has a bulk density of from about 0.06 to about 0.15 gm./cc. As sugar has a caloric content of about 18 calories per teaspoon, the product of the present invention has a caloric value of from about 0.9 to about 4.5 calories per teaspoon, preferably from about 0.9 to about 3 calories per teaspoon. The product of this invention may be used on an equal volume basis for sweetening coffee, tea, cereals and the like, and has the general appearance of household granulated sugar.

The artificial sweeteners employed in the compositions of this invention include saccharin (2,3-dihydro-3-oxobenzisosulfonazole), pharmacologically acceptable salts of saccharin and mixtures thereof. The pharmacologically acceptable salts of saccharin can be used and are preferable since they are more readily soluble. Suitable salts include the sodium, potassium, calcium, ammonium and magnesium salts.

The artificial sweetening agents are employed at a level sufficient to bring the sweetening power of the composition up to the sweetening power of the identical volume of household granulated sugar. This level may vary from about 0.5% to about 2%. Thus, for a product intended as a direct volume-to-volume substitute for granulated sugar, although the proportion of artificial sweetener to the bulk extenders may vary on a weight to weight basis as the bulk density of the product varies, it will be understood that the product will always contain a proportion of artificial sweetener so that a given volume of the product of the invention provides the same sweetening power as an equal volume of granulated sugar. It should be understood however that, as desired, either increased or decreased amounts of the artificial sweetening agents may be employed in products not intended to be used on an equal volume basis in place of granulated sugar.

The bulk extenders employed in the preparation of the compositions of this invention are specialized dextrinmaltose syrups derived from acid or enzymatic hydrolysis of cornstarch. These liquors are especially formulated to yield relatively low dextrose contents as compared to the common variety of corn syrups. Such liquors are relatively low in natural sweetness and have a Dextrose Equivalent (percent reducing sugar calculated as dextrose) of about 13 to 28%. It is also contemplated to employ mixtures of such hydrolysates. We have found that hydrolyzed corn starches having a Dextrose Equivalent below about 10% have the disadvantage of poor solubility characteristics tending to become gummy and sticky instead of entering into solution. Further, they possess various off-taste characteristics (such as flavor which tends to be "starchy" in character) which renders their use in a bulk sugar substitute undesirable. Hydrolysates having a Dextrose Equivalent above 28% are, on the other hand, too hygroscopic to be useful in such compositions.

The third essential ingredient of the compositions of this invention is arabinogalactan. Arabinogalactan is a water soluble polysaccharide of natural origin derived from western larch trees. It is a complex highly branched polymer of arabinose and galactose in a ratio of about 1:6 and has a molecular weight in the range of 72,000 to 92,000. In the compositions of this invention, it may be employed in the range of from 3% to 15%, most preferably at a level of 4 to 10%. It has been found that by incorporating this material in the required amount, a product is obtained which overcomes the aforesaid disadvantages of prior art materials. The amount of arabinogalactan is always less than that of the hydrolyzed cornstarch but greater than that of the artificial sweetener.

The compositions of the present invention comprise a major amount (over 75%) of hydrolyzed cornstarch having a dextrose equivalent of from about 13% to about 28%, from about 3% to about 15% arabinogalactan, and from about 0.5% to about 2% of artificial sweetening agent. They have a bulk density of from about 0.06 to about 0.2 gm./cc. and a caloric content of from 0.9 to 4.5 calories per teaspoon. Most preferably they have an arabinogalactan content of from 4 to 10%, a bulk density of from about 0.06 to about 0.15 gm./cc. and a caloric content of from about 1.2 to about 3 calories per teaspoon.

The products of this invention are made in a manner which, unlike the processes of the prior art, provide a low bulk density, substantially below those heretofore available, and at the same time provide a product which will not separate or segregate during handling and packaging. The artificial sweetening agent remains intimately dispersed among the particles of the bulk extenders thus insuring that all portions of the product are substantially uniform in composition even after packaging, handling and long periods of storage. In addition, the products of this invention are highly non-hygroscopic, and thus do not require the addition of flow controllers or other such additives, nor do they require the use of moistureproof packaging as is the case with prior art materials.

The products of this invention are prepared by dissolving the artificial sweetening agent, the cornstarch hydrolysate, and the arabinogalactan in a quantity of water, introducing finely divided inert gas, such as air or nitrogen, into the solution, and drying the aerated solution to provide material having a particle size range similar to that of granulated sugar.

In accordance with one embodiment of the instant invention, finely divided inert gas is introduced into the solution to provide a foam, which is dried under vacuum, the resulting dried cellular "loaf" being particulated to produce a product having the desired bulk density.

In the vacuum-drying process, the final bulk density of the product is controlled by the solids content of the solution treated, the amount of inert gas introduced into the mixture, by the conditions of drying, and the extent of comminution of the dried product. In order to produce a product having the desired bulk density, it is necessary to introduce inert gas to a level such that a foam density of 0.6 to 0.8 is produced. Increasing the amount of inert gas introduced into the mixture decreases the density of the product obtained and, conversely, decreasing the amount of inert gas introduced increases the bulk density of the product. The gas may be introduced into the liquid by any means known in the art to be suitable for this purpose, such as beater bars, pumps, whippers, gas injectors or dispargers, high speed shredder plates and the like.

The product may be dried under vacuum by any method known to the art, such as on trays, belts, drums and the like. The conditions of drying may be varied depending on the bulk density desired. It is normally desirable to employ as high a vacuum as possible. A pressure of less than 2 in. Hg absolute has been found to be particularly advantageous. Any temperature may be employed, including room temperature. It is undesirable to employ a temperature above about 95° C., as charring of material begins to occur at this temperature. A temperature of 90° C. has been found to be particularly advantageous, resulting in rapid setting up of the foam structure, and a moisture content in the final product of less than 2%.

Any convenient means may be used to comminute the dried foam to the desired size range. A gentle mill in conjunction with a particle classifying device is quite suitable. Milling of the dried foam with an oscillating granulator has been found to be quite advantageous.

In accordance with another embodiment of this invention a solution of starch hydrolyzate, arabinogalactan and artificial sweeteners is subjected to a pressure of from 500 to 5000 lbs. per square inch, preferably 2500 to 4000 lbs. per square inch. The pressurized solution is then aerated with an inert gas such as air, nitrogen, carbon dioxide or the like, and the aerated solution subsequently spray dried to produce a free-flowing solid product having the appearance of granulated sugar.

The bulk density of the final products of this process is dependent upon various factors, among which may be mentioned the solids content and temperature of the feed solution, the amount of added aeration gas, the pressure to which the feed solution is subjected, and the extent to which the heavier fines are recycled to the liquid inlet zone of the spray drier.

The solids content of the feed solution may range from 40 to 90 wt. percent, preferably from 50 to 80 wt. percent. In general, other variables remaining constant, a greater solids content in the feed solution results in a denser product. In order to achieve a bulk density of 0.12 g./cc., a density particularly preferred by applicants, the use of a feed solution having a solids content of about 65 wt. percent has been found to be particularly advantageous.

The bulk density of the final product of the spray drying process is also dependent upon the amount of aeration gas employed. In general, it has been found that the addition of 1 to 2 standard cubic feet per minute of aeration gas for each 10 gallons per hour of liquid feed to the spray drier results in a satisfactory product bulk density. The aeration gas is introduced into the pressurized liquid stream and thoroughly admixed into the liquid just prior to the actual spraying operation. The exact pressure and amount of aeration gas chosen, of course, is dependent upon the particular character and design of spray drying apparatus chosen. Such features as diameter of the atomizing nozzle, velocity of air flow, and the like, will dictate specific operating conditions for any particular spray drying unit. In accordance with the objects of this invention, the use of a single nozzle having an orifice diameter of 0.016 in. to 0.021 in. is preferred. When such as nozzle is employed, it is particularly preferred to employ a pressure of about 3000 lbs. per square inch.

The solution temperature may be virtually any temperature at which the solution employed possesses a workable viscosity. Usually such a temperature will range from about 50° F. to about 180° F., although to obtain improved solution viscosities it is preferable to employ temperatures of between 150° F. and 180° F. These temperatures have the added advantage of providing pasteurization which may be important if the solution must be held for any substantial period of time before drying.

The spray drying apparatus and its operating conditions is based upon a concurrent flow of liquid and heated air in the conventional manner. The apparatus is so operated that the product, as removed from the base of the chamber, has a moisture content of below 3% by weight. The fines produced are recovered in a second tower and continuously returned through a duct system and introduced into the liquid spray system. The air temperature in the drying chamber is in general controlled by controlling the exhaust air temperature to between 200 and 250° F., although the specific drying temperature employed will vary dependent upon the particular equipment employed.

The product produced by the above spray drying technique is a granular free flowing solid having a moisture content of between 1 and 3% by weight and a caloric content of less than 3 calories per 5 cc. (the volume of 1 level teaspoonful). The material has a combination of shapes, including, but not necessarily limited thereto, partial spheres, hollow irregular shapes modified by penetrant and non-penetrant hollowed tubes, and hollow tubes closed at the ends.

The following examples in which all parts are by weight unless otherwise indicated are intended to illustrate but not limit the invention.

EXAMPLE 1

1.19 kg. of magnesium oxide is dispersed in water heated to 70° C. To this dispersion is added 10.90 kg. of saccharin with stirring until a clear solution results. 52.50 kg. of arabinogalactan is then added to the solution and stirred until homogeneous. 881.13 kg. of cornstarch derived, liquid malto-dextrin (77.5% solids) having a dextrose equivalent of 27, heated to 70° C. is then added to the mixture and stirred until homogeneous to give 1,000 kg. of a solution containing 75% solids. This solution is then cooled to room temperature, and air, in the form of finely divided bubbles is introduced by means of beating the solution in a Hobart mixer for 5 mixtures to form a foam having an apparent density of 0.786 g./cc. This foam is spread in a tray, placed in a preheated oven and dried under a vacuum of 1 to 1.5 in. Hg absolute at a temperature of about 90° C. for 4 hours to produce a cellular "loaf" which is then particulated and sieved through a 14 mesh screen to give a product having a white, granulated appearance, a bulk density of about 0.096 g./cc., and a caloric value of about 1.9 calories per teaspoon, and which has approximately the same sweetening power, on a volume basis, as ordinary granulated sugar.

EXAMPLE 2

The procedure of Example 1 is followed except that in place of the magnesium oxide and saccharin there is employed 11.25 kg. of sodium saccharin. An equivalent product is obtained.

EXAMPLE 3

A solution is formed as set forth in Example 1. After cooling to room temperature this solution is beaten for 8 minutes in a Hobart mixer to form a foam having an apparent density of 0.696 g./cc. The foam is spread on a tray and placed in a cool oven under a vacuum of 1 to 1.5 in. Hg absolute. The oven is then brought to a temperature of 90° C. after 1 hour and thereafter maintained at a temperature between 89° and 90° C. for 3 hours. The dried product is then particulated and sieved through a 14 mesh screen to give a product having a white, granulated appearance and a bulk density of 0.118 g./cc., and a caloric value about ⅛ that of ordinary granulated sugar.

EXAMPLE 4

The procedure of Example 1 is followed except that the foam is dried in a continuous belt dryer under the same conditions of temperature and pressure as set forth in Example 1. After comminution an equivalent product is obtained.

EXAMPLE 5

A liquid solution is prepared as in Example 1, except that sufficient water is added to provide a solids content of 65 weight percent. After cooling to room temperature the solution is aerated as in Example 1 and dried on a vacuum drum drier at a steam pressure in the drums of 20 p.s.i.g. and a pressure in the drier of less than 1 in. Hg absolute. The dried product, consisting of friable flakes with some fluffy powder is then sieved through a 30 mesh screen to produce a product with the appearance of granulated sugar having an average bulk density of 0.15 to 0.2 g./cc.

EXAMPLE 6

The procedure of Example 1 is followed except that the solution prepared contains 1.2 kg. of MgO, 10.9 kg. of saccharin, 52.5 kg. of arabinogalactan, 81.2 kg. of a 70% solids liquid dextrin mixture, derived by the hydrolysis or cornstarch, and having a dextrose equivalent of 15, and sufficient water (about 54.3 kg.) to form 1000 kg. of a solution having a solids content of 68.5 weight percent. This solution is cooled to room temperature and beaten for about 10 minutes to form a foam having an apparent density of 0.8 g./cc. This foam is dried and particulated in the manner set forth in Example 1, except that the pressure is held to less than 1 in. Hg absolute, to provide a product having a white granulated appearance and a bulk density of about 0.085, and a caloric value of about 1.7 calories per teaspoon.

EXAMPLE 7

A syrup is prepared as in Example 1 except that it is diluted so as to possess a solids content of 60 weight percent. The solution temperature is maintained at about 175° F. throughout the operation.

The solution is subjected to a pressure of 3000 p.s.i.g. and forced through an atomizing nozzle of a spray dryer. Prior to reaching the nozzle the liquid stream is aerated by introducing a high pressure stream of air into it. The rate of introduction of air to the liquid stream is held between 1 and 2 standard cubic feet per minute for each 10 gallons per hour of liquid feed.

The nozzle employed has an orifice diameter of 0.021 in. and is fed virtually downward in a concurrent stream of hot air. The operating temperature of the drying chamber is controlled by varying the temperature of the inlet air so as to maintain the exhaust air temperature at between about 200° F. and about 250° F.

The air from the chamber passes through a first stage cyclone separator. The discharge from the chamber and the separator is through automatic valves which discharge the product and the fines. The fines are continuously recycled through a duct to the liquid inlet zone of the dryer. The density of the product from the chamber is adjusted by the inclusion of some of the fines and by the recycle of the remainder to reduce the density. The fines are heavier than the chamber material. A granular irregular shaped solid containing less than 3% by weight of moisture is produced.

The particles are a combination of irregular hollow objects with the addition of parts of broken particles which are added by the recycle operation. The product has an average bulk density between about 0.06 and 0.12 specific gravity. It is suitable for use as a bulk sugar substitute without any subsequent treatment or screening. The product has a caloric content of less than 3 calories per teaspoon.

What is claimed is:

1. A sugar substitute comprising a major amount of hydrolyzed cornstarch having a dextrose equivalent of from about 13% to about 28%, from about 3% to about 15% arabinogalactan, and from about 0.5% to about 2% of artificial sweetening agent, the sugar substitute having a bulk density of from about 0.06 to 0.15 gm./cc. and a caloric content of from about 0.9 to about 3 calories per teaspoon.

2. A sugar substitute according to claim 1 having from 4% to 10% of arabinogalactan.

3. A process for producing the sugar substitute of claim 1 which comprises (I) forming an aqueous solution of the hydrolyzed cornstarch, the arabinogalactan and the artificial sweetening agent;
(II) aerating the solution so formed with an inert gas; and
(III) drying the aerated solution.

4. A process in accordance with claim 3 wherein the drying is performed under vacuum to produce a dry cellular material which is then particulated into particles of irregular shape.

5. A process in accordance with claim 3 wherein the drying is performed by spray drying, under pressure, of the aerated solution, separating fines from the spray-dried product, and continuously recycling at least a portion of said fines to the spray drying operation.

References Cited

UNITED STATES PATENTS

| | | | |
|---|---|---|---|
| 3,325,296 | 1/1965 | Braaten | 99—141 |
| 3,294,544 | 12/1966 | Stanko | 99—79 |
| 3,170,800 | 2/1965 | Pader et al. | 99—141 |
| 3,170,801 | 2/1965 | McNaught | 99—141 |

RAYMOND N. JONES, Primary Examiner

R. B. ANDEWELT, Assistant Examiner

PO-1050
(5/69)

LF7a

UNITED STATES PATENT OFFICE
CERTIFICATE OF CORRECTION

Patent No. 3,704,138      Dated November 28, 1972

Inventor(s) Anthony Laurence LaVia et al.

It is certified that error appears in the above-identified patent and that said Letters Patent are hereby corrected as shown below:

Column 4, line 56, "such as nozzle" should read --such a nozzle--.
Column 5, line 32, "for 5 mixtures" should read --for 5 minutes--.
Column 6, line 11, "81.2 kg." should read --881.2 kg.--.
Column 6, line 13, "or cornstarch" should read --of cornstarch--.

Signed and sealed this 22nd day of May 1973.

(SEAL)
Attest:

EDWARD M. FLETCHER, JR.
Attesting Officer

ROBERT GOTTSCHALK
Commissioner of Patents